US012604211B2

(12) United States Patent (10) Patent No.: US 12,604,211 B2

Legay et al. (45) Date of Patent: Apr. 14, 2026

(54) METHOD FOR FORMING AND ALLOCATING BEAMS BY FREQUENCY SUB-BANDS FOR AN ACTIVE MULTI-BEAM SATELLITE ANTENNA

(71) Applicant: THALES, Courbevoie (FR)

(72) Inventors: Hervé Legay, Plaisance du Touch (FR); Florian Vidal, Toulouse (FR); Jean-Philippe Fraysse, Toulouse (FR)

(73) Assignee: THALES, Courbevoie (FR)

( * ) Notice: Subject to any disclaimer, the term of this patent is extended or adjusted under 35 U.S.C. 154(b) by 372 days.

(21) Appl. No.: 17/965,663

(22) Filed: Oct. 13, 2022

(65) Prior Publication Data

US 2023/0129605 A1    Apr. 27, 2023

(30) Foreign Application Priority Data

Oct. 21, 2021    (FR) ........................................ 2111165

(51) Int. Cl.
*H04W 16/28*        (2009.01)
*H04B 7/06*         (2006.01)
*H04W 84/06*        (2009.01)

(52) U.S. Cl.
CPC .......... *H04W 16/28* (2013.01); *H04B 7/0617* (2013.01); *H04W 84/06* (2013.01)

(58) Field of Classification Search
CPC .... H04W 16/28; H04W 84/06; H04B 7/0617; H04B 7/088; H04B 7/2041; H04B 7/0695; H04L 5/0023; H04L 5/0032
USPC ........................................................ 370/329
See application file for complete search history.

(56) References Cited

U.S. PATENT DOCUMENTS 6,067,050  A      5/2000  Shaker et al.
6,157,811  A     12/2000  Dent
2005/0101353  A1 *   5/2005  Zeira ...................... H01Q 25/00
                                                      455/562.1

(Continued)

FOREIGN PATENT DOCUMENTS

WO        WO-0165726 A1 *   9/2001  ......... H04B 7/18547
WO     WO-2021254607 A1 *  12/2021  ........... H04B 7/0452

OTHER PUBLICATIONS

Christopoulos, et al., "Linear and nonlinear techniques for multibeam joint processing in satellite communications", Eurasip J. Wireless Commun. Netw., May 2012.

(Continued)

*Primary Examiner* — Ayman A Abaza
*Assistant Examiner* — Tracy L Williams
(74) *Attorney, Agent, or Firm* — BakerHostetler

(57)             ABSTRACT

A method for allocating resources in an active multi-beam antenna satellite telecommunications system operating in a given frequency band and for a given coverage area wherein a plurality of user terminals is located, the method includes the steps of: decomposing the frequency band into sub-bands such that, in each sub-band, the beams formed by the antenna are stable for all of the frequencies of the sub-band, determining, for each sub-band, a grid of orthogonal beams making it possible to cover some of the coverage area, defining several subsets of user terminals and allocating, to each subset, one of the grids of orthogonal beams and a pointing direction of this grid so that each beam in the grid points towards at least one of the user terminals in the subset.

7 Claims, 9 Drawing Sheets

(56) References Cited

U.S. PATENT DOCUMENTS

| | | | | |
|---|---|---|---|---|
| 2005/0104763 | A1 * | 5/2005 | Hall | G01S 13/90 |
| | | | | 342/25 A |
| 2016/0134359 | A1 * | 5/2016 | Hirsch | H04B 7/2041 |
| | | | | 370/319 |
| 2016/0308603 | A1 * | 10/2016 | Hirsch | H04B 7/18539 |
| 2016/0352012 | A1 * | 12/2016 | Foo | H04B 7/043 |
| 2018/0270844 | A1 * | 9/2018 | Kim | H04L 5/0023 |
| 2020/0344776 | A1 * | 10/2020 | Sen | H04B 7/0413 |

OTHER PUBLICATIONS

Angeletti, et al., "A Pragmatic Approach to Massive MIMO for Broadband Telecommunication Satellites", IEEE Access, vol. 4, Jul. 2020.
Devillers, et al., "Joint Linear Precoding and Beamforming for the Forward Link of Multi-Beam Broadband Satellite Systems", IEEE Global Telecommunications Conference—Globecom, (2011).

\* cited by examiner

401

402

For each grid

For each orientation

Computation of criterion of proximity between users and beams ~ 601

Comparison of threshold criterion ~ 602

Selection of group of users and orientation ~ 603

Allocation of frequency resources ~ 604

METHOD FOR FORMING AND ALLOCATING BEAMS BY FREQUENCY SUB-BANDS FOR AN ACTIVE MULTI-BEAM SATELLITE ANTENNA

CROSS-REFERENCE TO RELATED APPLICATION

This application claims priority to foreign French patent application No. FR 2111165, filed on Oct. 21, 2021, the disclosure of which is incorporated by reference in its entirety.

FIELD OF THE INVENTION

The invention relates to the field of broadband multi-beam active antennas, in particular for flexible payloads for spatial telecommunications at a high bit rate, in which the ports of these multi-beam antennas are connected to a digital processor.

BACKGROUND

The invention bears more specifically on a method for forming beams by frequency sub-bands making it possible to maximize the spectral efficiency of an active antenna associated with a coverage area in which a set of users is located.

The invention also bears on a method for allocating the beams and sub-bands to a set of user terminals which are located in a given coverage area.

Multi-beam antennas are in the family of active array antennas, or of active array antennas magnified by an optical system, based on reflectors or on lenses. They are characterized in that a large number of radiating elements contributes to each beam, and that conversely each radiating element contributes to a large number of beams. This antenna architecture makes it possible, then, to flexibly allocate the power of the amplifier associated with each radiating element over the whole of the geographical area covered by the beams to which it contributes.

The digital processor digitally processes the signals. It is usually used to flexibly route and channel the signals between the ports of the various reception and transmission beams, incorporating frequency-division or time-division multiple-access techniques. It also makes it possible, and more specifically for these array antenna architectures operating at reception (or transmission), to combine (or divide) the signals of the reception (or transmission) radiating element ports with a reconfigurable weighting, thus performing a digital beamforming stage. The digital processor thus makes it possible to form several beams in the direction of various users.

Spatially allocating the same frequency resource to several users which are associated with different directions makes it possible to increase the bit rate of the payload by a factor which is, in the first order, equal to the number of times which the frequency resource is reused. It does, however, entail risks of interference between these users. Minimizing this interference requires each user to be incident in the main lobe of the beam which is dedicated to it, while at the same time being incident in the sidelobes at low levels, and even, preferably, in the nulls of the other beams dedicated to the other users to which the same frequency resource has been allocated. In transmission mode over the forward link from the satellite to the users, if the antenna gain produced by the beam dedicated to each user is $C_i$, and if the gains produced by this beam in the direction of the user j (with $j \neq i$) are $I_j$, it is then necessary to maximize, for each user i: $C_i/\Sigma Ij$.

Maximizing the ratio $C_i/\Sigma I_j$, for each user makes it possible to improve the spectral efficiency of the user link, that is to say the number of bits which it is possible to transmit through the link per unit of frequency band.

In order to minimize this interference, each beam may be reconfigured by modifying the weighting of the beamforming, in order to have low levels of radiation in the direction of the other users using the same frequency resource, while at the same time maintaining a high gain in the direction of each user. Reconfiguring these beams, which makes it possible to produce radiation attenuation, and even nulls in the direction of the interfering users while at the same time exhibiting an antenna gain in the direction of each user is, however, possible only if the users are separated spatially by a distance corresponding to the angular width of a beam. More specifically, in order to comply with this constraint, it is necessary, for example, for the users to be separated by a distance which is greater than the angular half-width at $-12$ dB of a beam, this corresponding approximately to the angular width at $-3$ dB of a beam.

In order to maximize the bit rate of a multi-beam antenna, it is therefore necessary to comply with the following contradictory constraints for allocating the same frequency resource to various users:

the users must be sufficiently far apart in order not to be picked up in the same lobe of a beam (problem of interference between users), the resource must be reassigned to users which are sufficiently close together in order to be able to be reused as many times as possible (problem of optimizing the bit rate).

There is therefore a need for a method making it possible to reuse the resource as many times as possible while at the same time making it possible to minimize co-channel interference via spatial filtering techniques.

One problem to solve consists in maximizing the bit rate by producing optimal beam coverage and in adapting this multi-beam coverage to the traffic, i.e. to the spatial distribution of the users.

Another problem to solve consists in mitigating the frequency dispersion of the beamforming. The width of a beam produced by an array antenna or an array antenna imaged by a reflector changes as a function of frequency. The same applies for the position of the radiation nulls and sidelobes. The result is that, for a given weighting, the interfering signal is picked up at gain levels which may vary in the frequency band. It is therefore difficult to maintain high attenuation in the direction of the interfering users.

There is therefore also a need for a method for allocating frequency resources making it possible to minimize co-channel interference.

One reference method for reallocating the resource while minimizing interference is to divide the available band into four and to distribute these sub-bands across cells according to a four-colour scheme, so that no adjacent cell shares the same sub-band. This method is simple, widely used, and well adapted to multi-beam passive antennas which are not reconfigurable. It is not, however, optimal. It is not possible to allocate more than a quarter of the whole band of the antenna to each cell. As certain areas may lack band and others have an excess thereof, it is therefore not possible to process non-uniform traffic scenarios using this technique.

One variant of this reference method consists in modulating the size of the beams and the passband allocated to these beams in order to introduce flexibility into the allocation of the frequency resources, in order to adapt to the spatial dispersion of the traffic. Frequency plan colouring is an NP-hard problem and solving it relies on heuristics. These techniques aim to reduce interference, but do not incorporate algorithms for nullifying interference.

Another known method, referred to as the precoding method, developed for terrestrial communication networks, aims to improve the spectral efficiency of the links and to reduce co-channel interference. The technique consists in characterizing the matrix H representing the propagation channel for the various beams from the antenna in the direction of the users.

This matrix H characterizes, for each beam, the gain in the direction of the user at which the beam is directed, as well as the insulation produced in the direction of the interfering users. A precoding matrix W is then computed, which aims to eliminate or reduce this interference. This makes it possible to return the diagonal matrix HW.

The precoding method is also applied to spatial telecommunications networks, for example in reference [1]. The objective is essentially to increase the rate of reuse of the frequency resources in comparison to the 4-colour frequency reuse scenario.

The channel matrix H may be evaluated via detection of pilot sequences by each user terminal so as to discriminate between the signals originating from various beams. When the number of beams increases, this method has the drawback of high complexity. The waveform of the signal uses a frame in which a limited number of these pilot sequences are included.

It is then necessary to group together the close-together users, and to compute the precoding matrix which is common to these users (see, for example, reference [2]). The resulting performance deteriorates when the users grouped together for evaluating this channel matrix are too far apart.

The precoding matrix W is preferably computed using a minimum mean square error or MMSE method. This method makes it possible to weight nullification of the desired signals by virtue of a regulation coefficient $\alpha$.

The technique based on evaluation of these channel matrices H by the user terminal therefore has strong limitations when it is applied to multi-beam antennas for spatial applications.

Another approach then consists in constructing these matrices, by virtue of the information on the position of the users provided by other devices, and in knowing the radiation diagrams of the various beams, by simulation or by measurement.

A solution proposed in publication [3] consists in assigning different time or frequency resources to the close-together user terminals. A minimum distance below which two users cannot share the same resource is defined.

For each subset of users to which the same resource has been assigned, beams are selected from a set of preformed beams. They are directed in the direction of the various users. This technique has been evaluated positively in terms of performance and complexity. It does without algorithmic processing, of MMSE type, for minimizing the interference of the users to which the same time resource has been assigned.

However, this method has two drawbacks. First of all, it is not optimal in terms of spectral efficiency and it does not take into account the phenomena of frequency dispersion of the antenna.

The frequency dispersion of the radiation patterns of a reconfigurable array antenna is also a well-known feature.

The larger the size of the antenna and the greater the angular sector are, the greater it is. It originates from the fact that it is practical to reconfigure the pattern of an array antenna by means of a beamformer using phase weighting for coherently combining the contributions of the various radiating elements in a given direction while what is actually needed is delayed weighting. The result of this simplification is a depointing of the beam in frequency terms, which is greater the larger the depointing angle is.

It is possible to produce delayed weightings, both for analogue beamformers and for digital beamformers. This solution makes it possible to partially solve the problem of the error produced when the radiating elements are controlled by phase weightings.

However, the complexity of these beamformers, referred to as true time delay or TTD beamformers, is greater. In addition, even with beamforming based on delays, the sidelobes of the antenna pattern become dispersive in frequency terms.

The result is that, even in the presence of beamforming based on delays, it is not possible to maintain, over a wide frequency band, a stable pattern for which the nulls between the lobes are formed in the direction of interfering users. The ratio C/I averaged over the whole band is therefore liable to deteriorate, and all the more so the greater the angular sector is or the larger the antenna is.

SUMMARY OF THE INVENTION

The invention aims in particular to mitigate the limitations of the method described in [3], taking into account the dispersion, in frequency terms, of the antenna patterns formed and by improving the overall spectral efficiency for all of the users in an area.

One subject of the invention is a method for allocating resources in a system for telecommunications by a satellite with an active multi-beam antenna operating in a given frequency band and for a given coverage area in which a plurality of user terminals is located, the method comprising the steps of:

decomposing the frequency band into sub-bands such that, in each sub-band, the beams formed by the antenna are stable for all of the frequencies of the sub-band, determining, for each sub-band, a grid of orthogonal beams making it possible to cover some of the coverage area, defining several subsets of user terminals and allocating, to each subset, one of the grids of orthogonal beams and a pointing direction of this grid so that each beam in the grid points towards at least one of the user terminals in the subset.

According to one particular aspect of the invention, a grid of orthogonal beams is determined so that the local maxima of the gain of a beam are positioned substantially at the local minima of the gain of the beams which are adjacent to it.

According to one particular aspect of the invention, a grid of orthogonal beams and a pointing direction is allocated to each subset so that each user terminal is located at a distance from the centre of a beam which is less than a tenth of the width of the beam measured at 3 dB.

According to one particular aspect of the invention, the allocation step is performed via the following sub-steps, for each grid of orthogonal beams:

determining a subset of user terminals and a pointing direction of the grid such that all the user terminals in the subset are positioned at a distance from the centre of a beam which is less than a predetermined maximum distance, allocating, to the user terminals, frequency resources in the frequency sub-band which is associated with the grid.

In one variant embodiment, the method further comprises the step of, when user terminals in the coverage area are not selected at the end of the allocation step, reducing the size of the frequency sub-bands and carrying out the allocation step again.

According to one particular aspect of the invention, the width of a frequency sub-band $\Delta f$ is, at the maximum, equal to $\Delta f < \alpha$. $f_0 * \lambda/(L. \sin \theta)$, with $f_0$ being the centre frequency of the sub-band, L the greatest length of the antenna, and $\theta$ the maximum angle of the multi-beam coverage.

Another subject of the invention is a satellite payload, comprising an antenna array, a device for allocating frequencies by sub-bands and a beamforming device which are configured to jointly implement the method for allocating resources according to the invention.

BRIEF DESCRIPTION OF THE DRAWINGS

Other features and advantages of the present invention will become more apparent on reading the description which follows in relation to the following appended drawings.

DETAILED DESCRIPTION

The invention proposes producing several grids of orthogonal preformed beams. In other words, the beams are separated from one another so that the local maxima of the gain of a beam are positioned at the local minima of the gain of the adjacent beams. In this way, interference between adjacent beams is minimized while at the same time the number of beams in a given coverage area is maximized.

Figure 1:
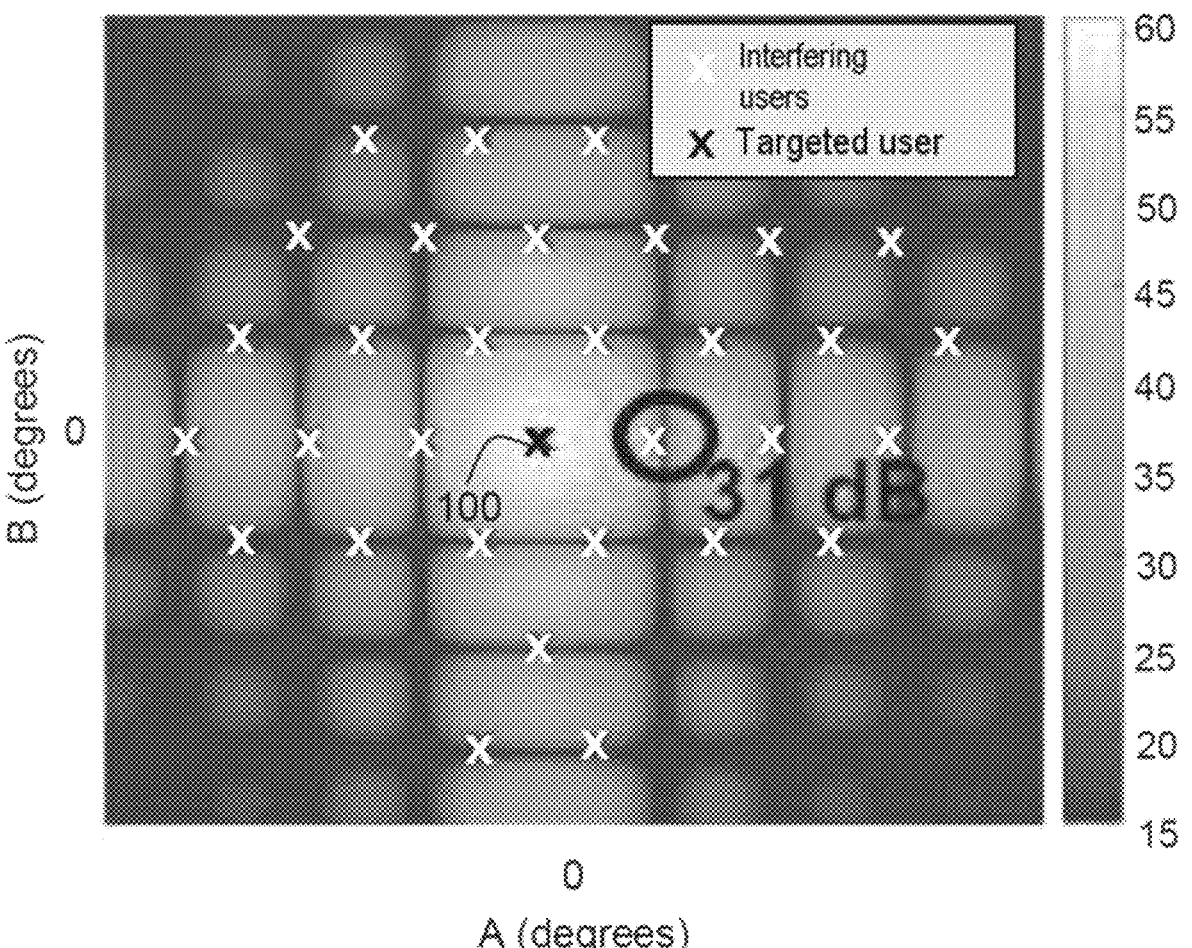
FIG. 1 shows an antenna pattern illustrating a grid of orthogonal beams.

FIG. 1 schematically shows an antenna pattern of a beam, the centre of which is identified by a cross and the reference symbol 100. The other crosses in FIG. 1 schematically depict the positions of the centres of the antenna patterns of the other beams in a grid of orthogonal beams. The centres of the other beams are positioned at the minima of the beam illustrated in FIG. 1. These minima are located between the main lobe of the beam and the adjacent sidelobes or between various sidelobes.

It appears that, for such a grid of beams, the spectral efficiency obtained by associating each beam with a user terminal (which corresponds to each cross in FIG. 1) is similar to that which would be obtained using a precoding method according to the prior art. Such processing, then, is no longer of interest and it is possible to dispense with its complex implementation.

Figure 2:
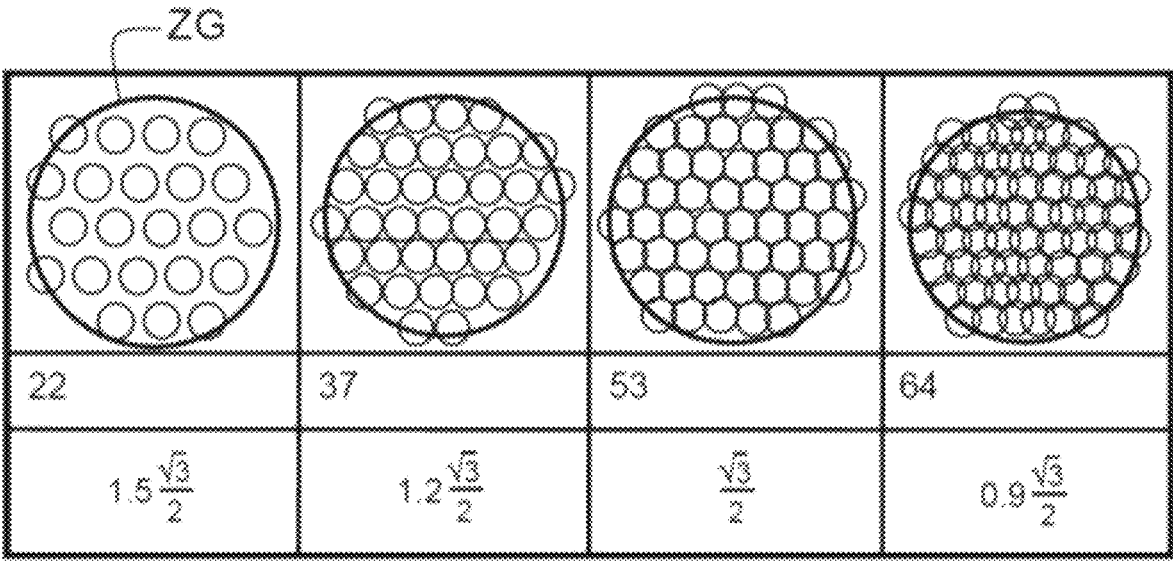
FIG. 2 illustrates results of a study of the spectral efficiency obtained for various configurations of grids of beams.
Figure 2:
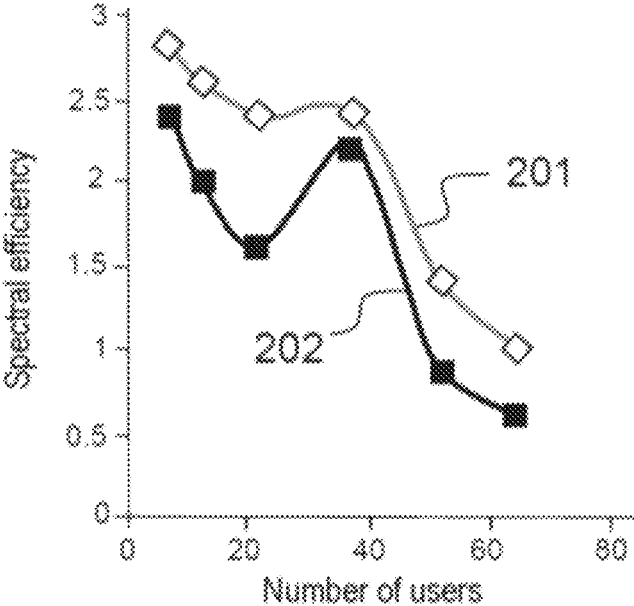

This advantageous property is demonstrated in the parametric study illustrated in FIG. 2, which consists in determining an optimal number of beams for covering a given geographical area ZG.

On the left of FIG. 2 four different configurations of grids of beams for the same geographical area ZG are shown. The four configurations correspond to numbers of beams equal to 22, 37, 53 and 64, respectively.

The diagram on the right of FIG. 2 shows the spectral efficiency obtained (in bits/s/Hz) for various numbers of beams, with precoding (curve 201) or without precoding (curve 202). It is supposed that each beam points towards a user terminal located exactly in the direction of the centre of the main lobe of the beam.

It may be seen in this diagram that the curve without precoding 202 comes closest to the curve with precoding 201 for a number of preformed beams which is equal to 37, this corresponding to a grid of beams which are orthogonal to one another.

By contrast, for a number of beams which is equal to 22, the maxima of the beams are positioned on the first sidelobes of the other beams. In this configuration, the signal-to-interference ratio C/I and the spectral efficiency deteriorate.

For the 22-beam configuration, precoding techniques make it possible to improve spectral efficiency, at the cost of additional processing. Adaptive weighting makes it possible to produce nulls in the direction of the co-channel interference without deteriorating the gain towards the users.

For the 53- or 64-beam configuration, the beams are highly interleaved, and precoding brings only a little improvement. It is not possible to produce nulls without conserving the gain towards the users.

Thus, the coverage of a geographical area with multiple beams the local maxima (the main lobe and the sidelobes) of which are positioned at the location of the local minima of the other beams makes it possible to obtain optimal performance without needing to implement adaptive processing of precoding type, which is complicated to perform.

The invention proposes, in addition, defining different grids of orthogonal beams for each frequency sub-band so as to guarantee that the beams are stable over the whole of the sub-band under consideration.

For this purpose, the whole frequency band of the antenna is decomposed into sub-bands, the widths of which are set so that the beams are stable in each sub-band, both at the main lobes and the sidelobes. The stability of a beam is defined by an absence of variation in the antenna pattern (depending on the angular pointing direction) according to frequency. In other words, it is considered that a beam is stable over a given frequency range if the average variation in the antenna gain over this range does not exceed a predetermined value.

This decomposition into sub-bands makes it possible to take advantage of the dispersive nature of the antenna. As the width of the beams varies in frequency terms, and the local minima of the beams move in frequency terms, the grids of orthogonal beams produced are different in each frequency sub-band.

The number of grids of beams is greater than the number of sub-bands for which the frequency dispersion of the antenna is low and has no major effect on the radiation patterns. This frequency dispersion increases with the size of the antenna and the pointing angle of the beam.

According to one example of an embodiment, the sub-bands chosen have a width $\Delta f$ which is strictly less than $\Delta f < \alpha$. $f_0 * \lambda / (L . \sin \theta)$, with $\alpha$ being a number preferably chosen between 0.3 and 0.5 according to whether the dispersion criterion is applied strictly or standardly.

$f_0$ is the centre frequency of the sub-band, which may be approximated by the operational frequency of the antenna, that is to say the centre frequency of the whole frequency band in which the antenna is operational.

L is the largest length of the antenna.

$\theta$ denotes the maximum angle of the multi-beam coverage.

$\lambda$ is the wavelength.

Thus, for an example of an antenna having a largest length L which is equal to 240 $\lambda$, for a beam pointed at 8.5°, and an operational frequency of 20 GHz, the width of a sub-band is 170 MHz in strict application mode or 280 MHz in standard application mode, or between 11 and 17 sub-bands for a whole band of 3 GHz between 18.5 GHz and 21.5 GHz.

Figure 3:
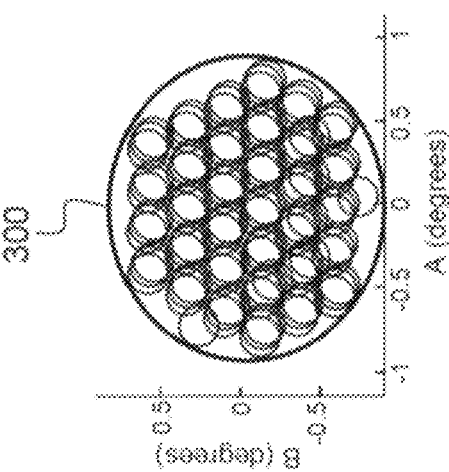
FIG. 3 illustrates several grids of orthogonal beams defined for various frequency sub-bands.
Figure 3:
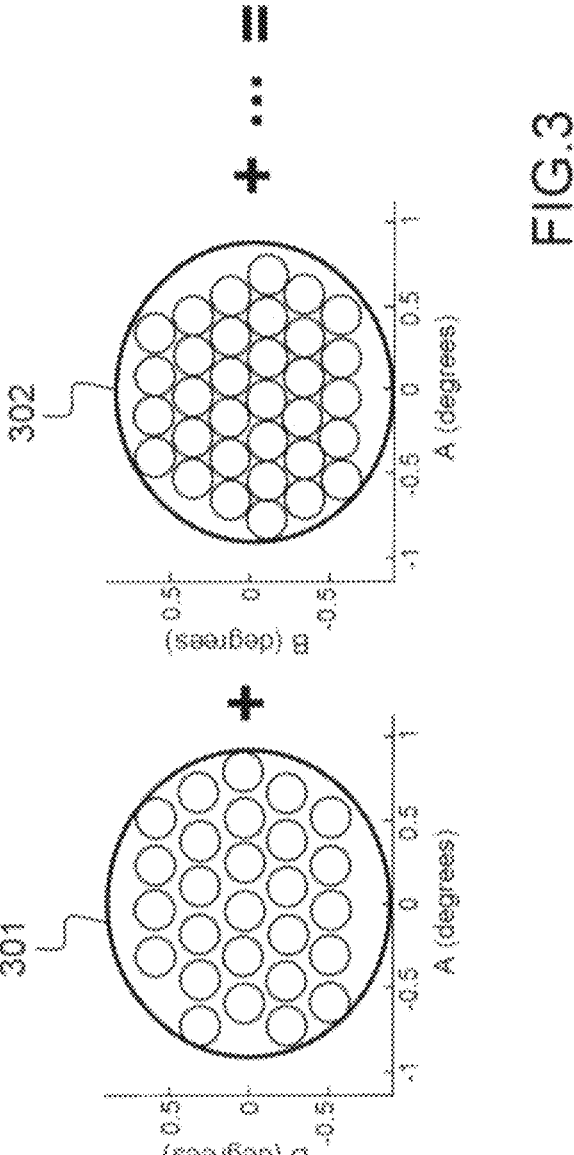

FIG. 3 illustrates, on an example, several grids of orthogonal beams 301, 302 generated for different frequency sub-bands as well as the result 300 of superposing these various grids for all of the sub-bands constituting the frequency band of the antenna.

In order to optimize spectral efficiency, the sub-bands (and therefore the associated grids of orthogonal beams) are allocated to different sets of user terminals so that each beam points towards a different user terminal.

The grids of beams by sub-band may be adjusted in direction terms so as to adapt as much as possible to the distribution of the user terminals in a given coverage area. Thus, the grids of beams have an angular depointing capacity and may be oriented so as to maximize the gain as a function of the users targeted and to pick up the interfering users at the local minima of the beam. The angular depointing capacity of a grid of beams is, for example, less than the distance between two beams, taken at a predetermined value of the maximum of the beam which is, for example, equal to 3 dB.

Figure 4:
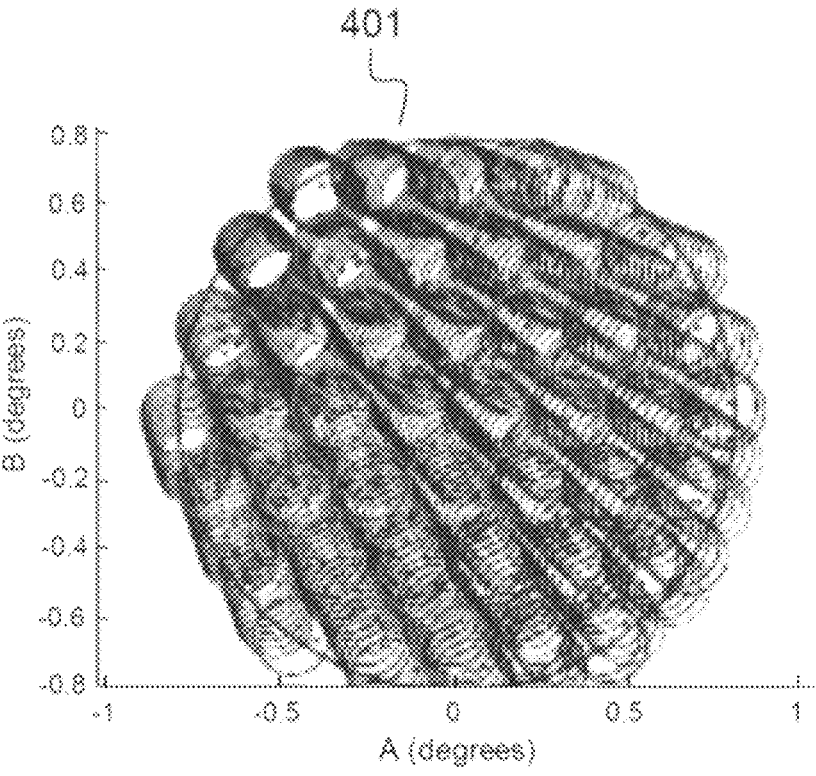
FIG. 4 illustrates the superposition of several grids of orthogonal beams with and without orientation, FIG. 5 schematically depicts, in a flowchart, the steps of the method for allocating resources according to one embodiment of the invention, FIG. 6 schematically depicts, in a flowchart, an example of an embodiment of the step of associating grids of beams with groups of users.
Figure 4:
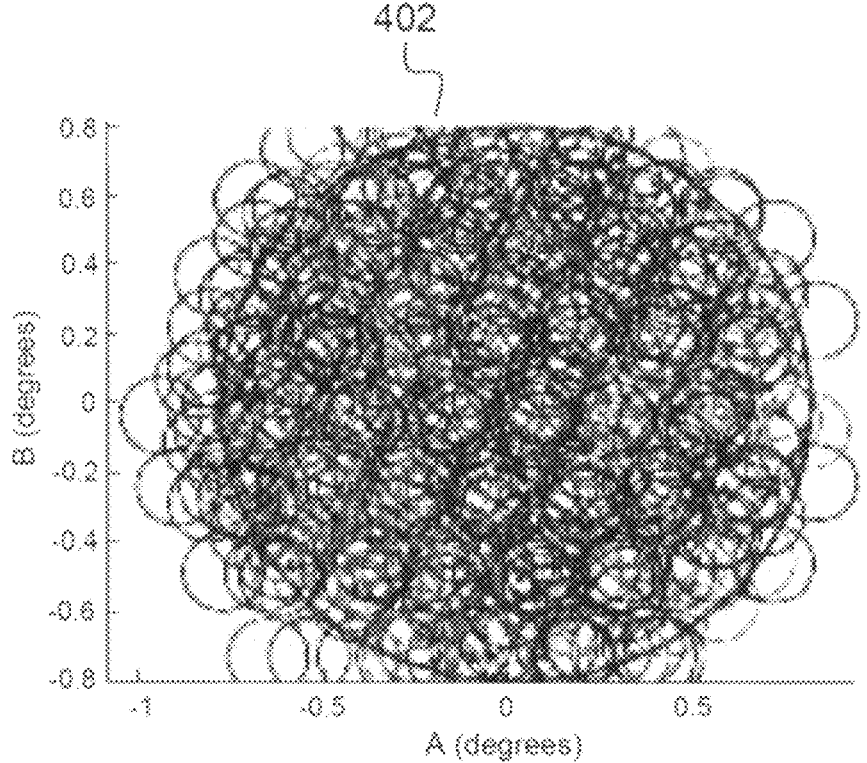

FIG. 4 shows an example of a superposition of grids of orthogonal beams by sub-band (Figure 401) and the same superposition after applying a particular orientation of each grid in order to adapt the coverage to the positions of the user terminals in the coverage area (Figure 402).

The beams are preferably generated on the basis of a uniform distribution law as such a law makes it possible to obtain directional beams. In one variant embodiment, other beam synthesis laws may be chosen so as to make the distance between the local minima and the local maxima of the antenna pattern vary. One advantage of this variant is that it makes it possible to adapt more minutely to the distances between user terminals.

On the basis of the grids of orthogonal beams preformed for each frequency sub-band, one objective of the invention is to allocate these resources to various subsets of users as well as possible.

For this purpose, the invention proposes a method for allocating resources which has the aim of defining subsets of user terminals which are sufficiently far away from one another, associating each subset with a frequency sub-band, and applying angular depointing to the grid of orthogonal beams which is associated with the sub-band selected in order for the beams to point in the direction of the various users.

The sensitivity of the positioning of the user terminals with respect to the centres of the beams is such that each terminal may be assigned to a beam as soon as its position complies with a normal law of standard deviation $\sigma = \Delta / 10$ around the pointing direction corresponding to the maximum of the beam, with $\Delta$ being the width of the beam in the sub-band under consideration, preferably measured at 3 dB from the maximum of the main lobe of the beam. With this tolerance, it is possible to associate a beam with several user terminals in so far as they all comply with this condition on the distance from the centre of the beam.

Figure 5:
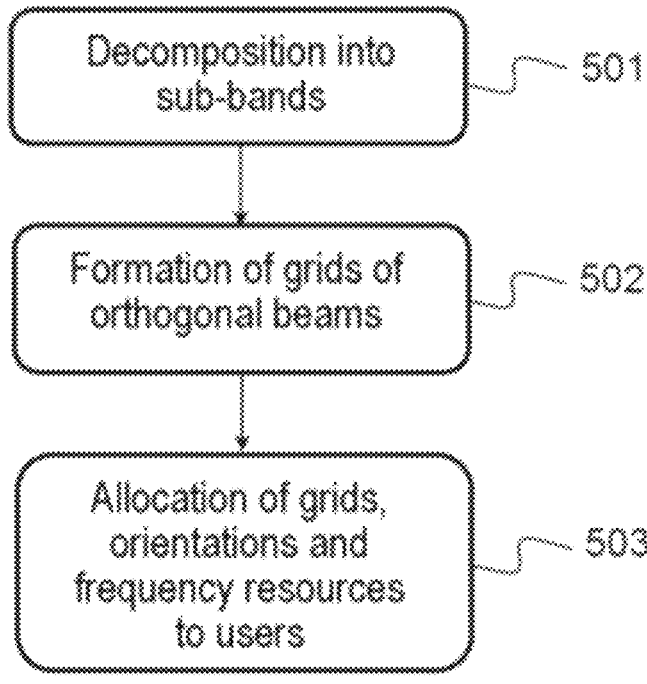

FIG. 5 schematically depicts, in a flowchart, the steps for implementing a method for allocating resources according to one embodiment of the invention.

The method aims to allocate, to a set of user terminals which are located in a geographical coverage area, a corresponding set of preformed beams in the form of a grid of orthogonal beams, a pointing direction of this grid and a frequency sub-band which is associated with this grid.

In the step 501, the whole frequency band of the satellite antenna is decomposed into sub-bands, the widths of which are defined so that the beams formed are stable for all the frequencies of a sub-band. The width of the sub-bands is, for example, equal, at the maximum, to $\Delta f$ (see previously introduced definition).

In the step 502, a grid of orthogonal beams, the beams in which are stable over the width of the sub-band, is defined for each sub-band.

In the step 503, subsets of user terminals are selected (on the basis of a map describing the coordinates of the users in a coverage area). In each subset defined, the users are separated from one another by an angular separation (from the point of view of the satellite) corresponding to the distance between the maximum of the main lobe of a beam and the local minimum between the main lobe and the first sidelobe of the beam. A tolerance corresponding to a normal law of standard deviation $\sigma = \Delta / 10$ is taken into consideration in computing the distances between users as explained previously. To each subset defined there are allocated a grid of orthogonal beams (which is associated with a sub-band) and a pointing orientation of this grid for making it coincide as well as possible with the positions of the user terminals in the subset. One objective is for each user terminal to be located close to the centre of the main lobe of one of the beams in the grid with a tolerance of $\sigma = \Delta / 10$. Thus, several user terminals may be irradiated by the same beam in so far as they comply with this distance criterion. In other words, at the end of the step 503, each beam is associated with a group of users which are separated from the centre by a predetermined distance. The various users irradiated by the same beam share the same frequency sub-band but get allocated different frequency carriers within this sub-band. The frequency carriers are assigned among users sharing the same sub-band so as to maximize a criterion of the distance between users using the same frequency carrier, in order to minimize interference between users.

Figure 6:
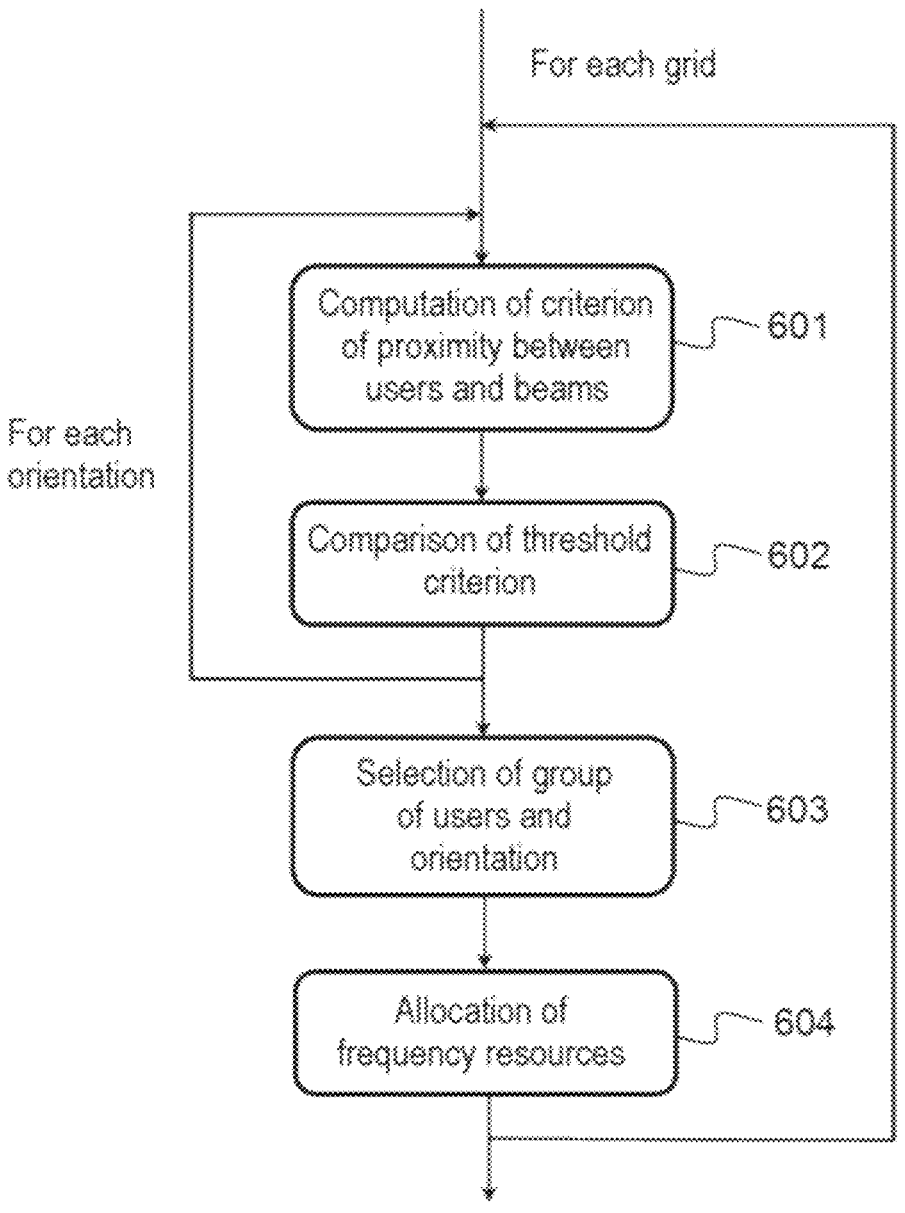

According to one particular embodiment, the step 503 is performed via the following algorithm, schematically depicted in FIG. 6.

The algorithm takes as input a map of all of the user terminals in the coverage area and their demand in frequency band terms. It also takes as input all of the grids of orthogonal beams determined in the step 502 with the associated frequency sub-bands defined in the step 501 as well as a set of possible orientations of these grids. The various orientations may also be seen as positionings of the centres of the beams with respect to a point in the area. The algorithm also takes as input a parameter of the maximum acceptable distance between a user and the centre of the beam which is allocated to it. This maximum distance is, for example, defined on the basis of a tolerance corresponding to a normal law of standard deviation $\sigma = \Delta/10$.

The algorithm processes each grid of orthogonal beams sequentially, searching, in each iteration, for a group of user terminals to associate with the current grid of beams as well as an orientation of this grid.

For this purpose, for each possible orientation of the current grid of beams, in the step 601 a criterion of the proximity between users and centres of the beams of the grid is computed. This criterion consists in determining the number of users which are at a distance from a centre of a beam which is less than the maximum acceptable distance.

In the step 602, this criterion is compared with a threshold initialized to 0; if the criterion exceeds the threshold, then the orientation retained is updated with the current orientation and the threshold is updated with the number of users which is computed in the step 601.

The steps 601 and 602 are iterated for all the possible orientations of the grid of beams and at the end (step 603) there are retained a set of user terminals and an orientation of the grid of beams which are such that each user terminal in the set is located at a distance from the centre of a beam in the grid which is less than the maximum acceptable distance with a retained number of user terminals, which is maximized.

In the step 604, the allocation of the frequency carriers, within the sub-band determined, is then determined for each user in the set determined in the preceding step 603 in accordance with the demand of each user but without exceeding the capacity of the frequency sub-band which is available. This step 604 consists in particular in allocating the carriers to the various users, maximizing the distance between users which are assigned to the same carrier.

The steps 601-604 are iterated for each grid of orthogonal beams, eliminating, in each new iteration, the user terminals which have already been associated with grids of beams, from the list of user terminals to be served.

In one variant embodiment, if residual users remain in the coverage area after all the sub-bands have been allocated, the allocation algorithm is run again, reducing the size of the sub-bands and therefore increasing the number of sub-bands. The number of sub-bands is, however, limited, as the width of the sub-band must remain greater than the sum of the widths of the carriers which are dedicated to the users. If there remain unassigned users only in a limited number of beams, it is also possible to reduce the width of the carriers in this beam, in order for the various users to share the frequency resource while at the same time complying with an allocation policy in which the priorities are defined by the operator. Another option consists in locally relaxing the constraint on the distance of certain users from the centre of the beam.

Residual users may remain in two cases. In a first case, in certain beams, the aggregated band of the carriers which are associated with the users selected exceeds the width of the sub-bands. In a second case, the grids of beams are oriented so that they do not make it possible to cover certain users which are too far away from the maximum of a beam.

The grids of beams are oriented so that they do not make it possible to cover certain users, which are too far away from the maximum of a beam.

Figure 7:
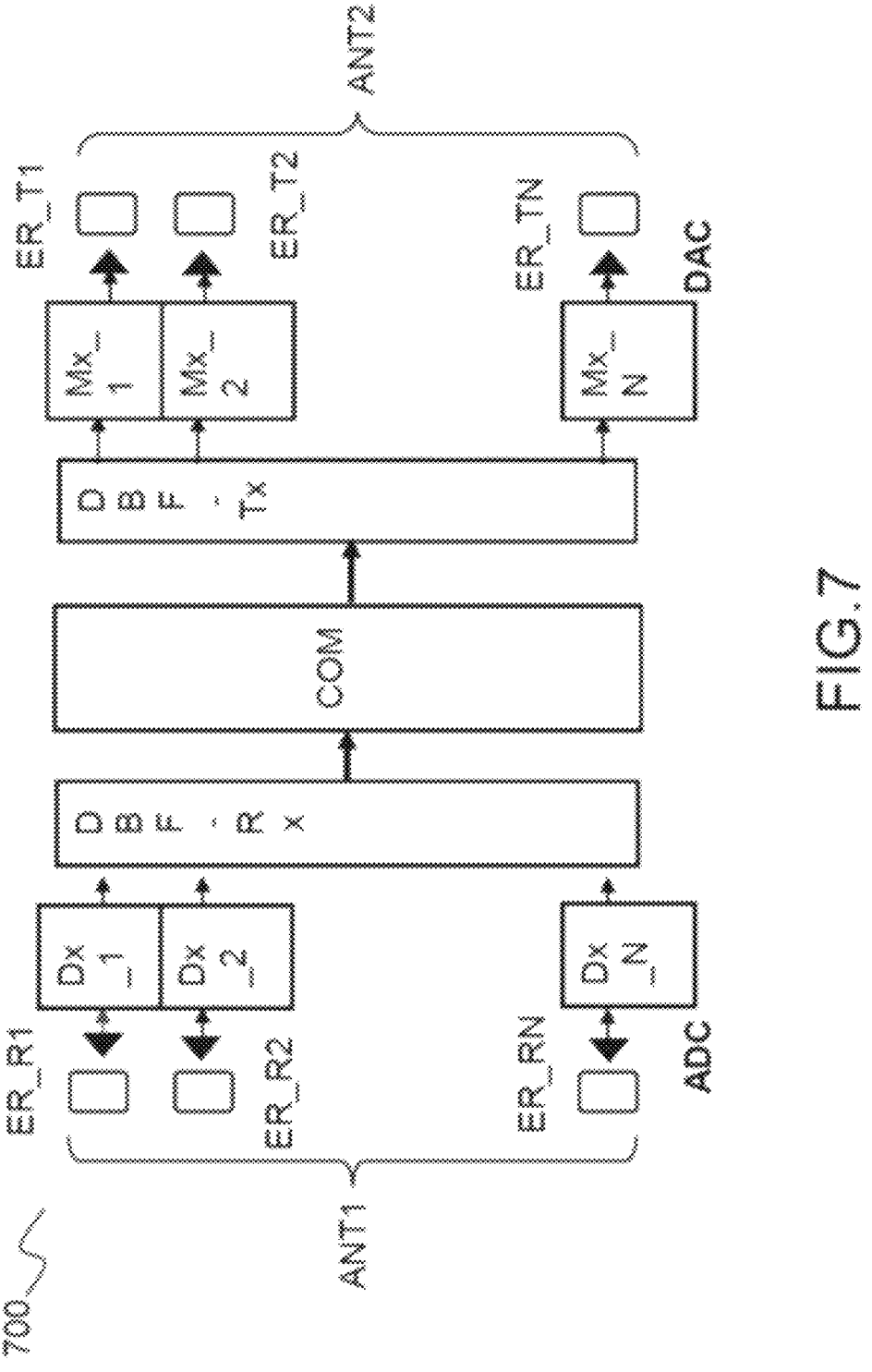
FIG. 7 shows a diagram of an example of a payload of a multi-beam satellite configured to implement the invention.

FIG. 7 shows a diagram of a payload 700 of a multi-beam satellite adapted to implement the invention.

The payload 700 comprises a first array antenna ANT1 composed of a plurality of radiating elements ER_R1, ER_RN. Each radiating element ER_R1, ER_RN is associated with a reception path comprising an analogue-to-digital converter ADC_1, ADC_N and a demultiplexer Dx_1, Dx_N. The demultiplexers of all of the reception paths feed a digital beamforming array DBF_Rx. A switch COM switches the signals at the output of the digital beamformer DBF_Rx of the uplink towards the ports indexed by frequency band and by beam position. The function of the switch COM is in particular to separate the frequency carriers allocated to the various users on the up-path, to route them and to aggregate them in order to construct the frequency sub-bands of the downpath. More generally, the function of the switch COM is in particular to produce the mechanism for allocating frequencies to the users by sub-band, each sub-band being associated with a grid of beams.

The switched signals at the output of the switch COM are relayed to a second digital beamforming array DBF_Tx for forming beams over the downlink. The outputs of the second beamformer feed transmission chains each comprising a multiplexer Mx_1, Mx_N, a digital-to-analogue converter DAC_1, DAC_N and a radiating element ER_T1, ER_TN. The radiating elements together form a second array antenna ANT2 for the downpath.

The invention is mainly implemented via the digital beamformers DBF_Rx, DBF_Tx.

Figure 8:
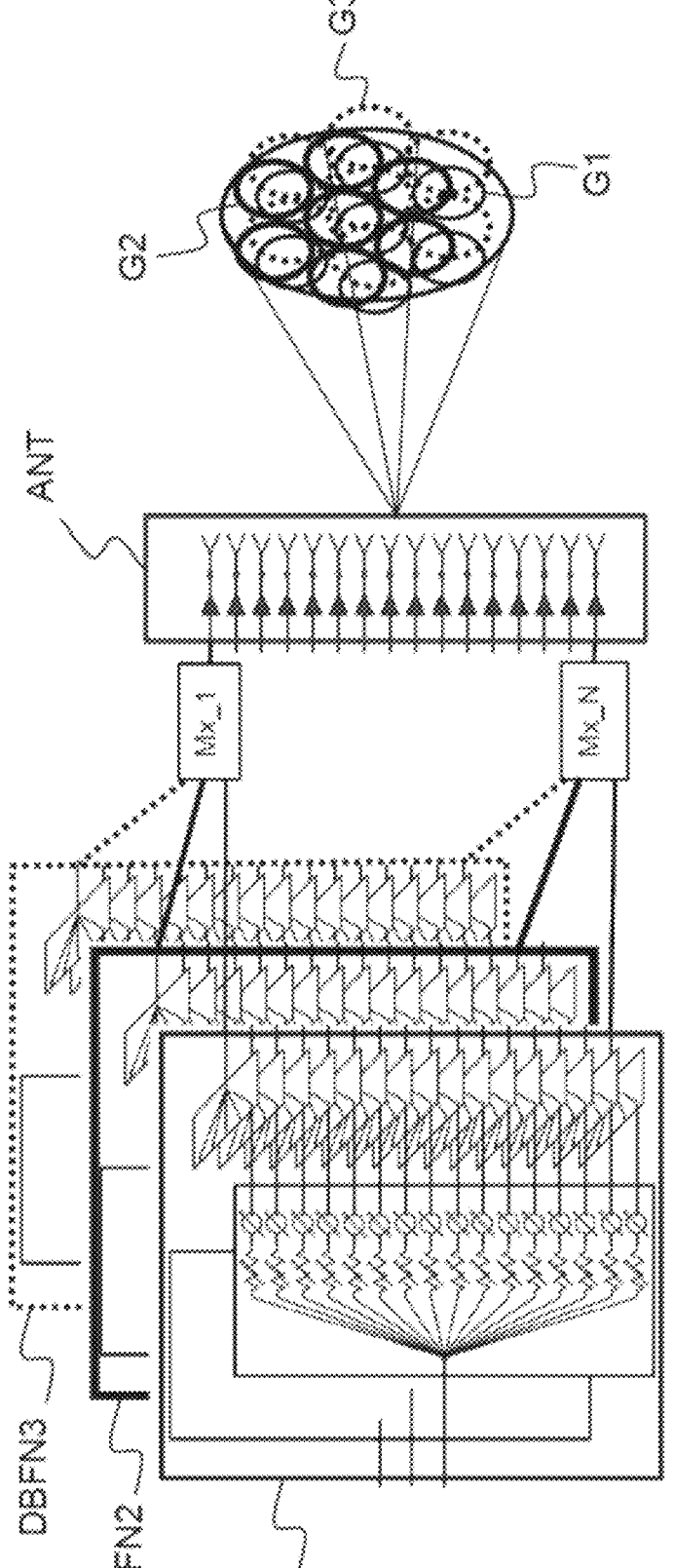
FIG. 8 shows a first embodiment of a beamformer configured to implement the invention.

FIG. 8 schematically depicts the operation of a digital beamformer DBFN for forming a grid of orthogonal beams according to a first embodiment of the invention.

The two beamformers DBF_Rx, DBF_Tx operate identically. FIG. 8 illustrates the operation of a downpath beamformer.

The digital processing performed in order to form a grid of orthogonal beams which is associated with a given pointing direction is the same for all the grids of beams chosen and all the pointing directions.

FIG. 8 schematically shows a digital beamforming array DBFN which receives as input signals originating from the switch COM at several beam access ports. The signals received as input are each divided as many times as there are radiating elements and each signal undergoes phase and amplitude weighting, which may be programmed according to the pointing direction chosen.

FIG. 8 schematically depicts three digital beamforming arrays DBFN1, DBFN2, DBFN3 which implement the same digital processing but with different phase and amplitude weighting laws in order to form the same grid of orthogonal beams but with different pointing directions. On the right of FIG. 8 the three grids of beams oriented in three different directions defined by the three arrays DBFN1, DBFN2, DBFN3, respectively, are schematically depicted.

The output signals of the digital beamformer DBFN are then recombined via a multiplexer Mx_1, Mx_N at each radiating element of the antenna array ANT. The number of beam ports of the digital beamformer is less than the number of possible positions in the grid.

Figure 9:
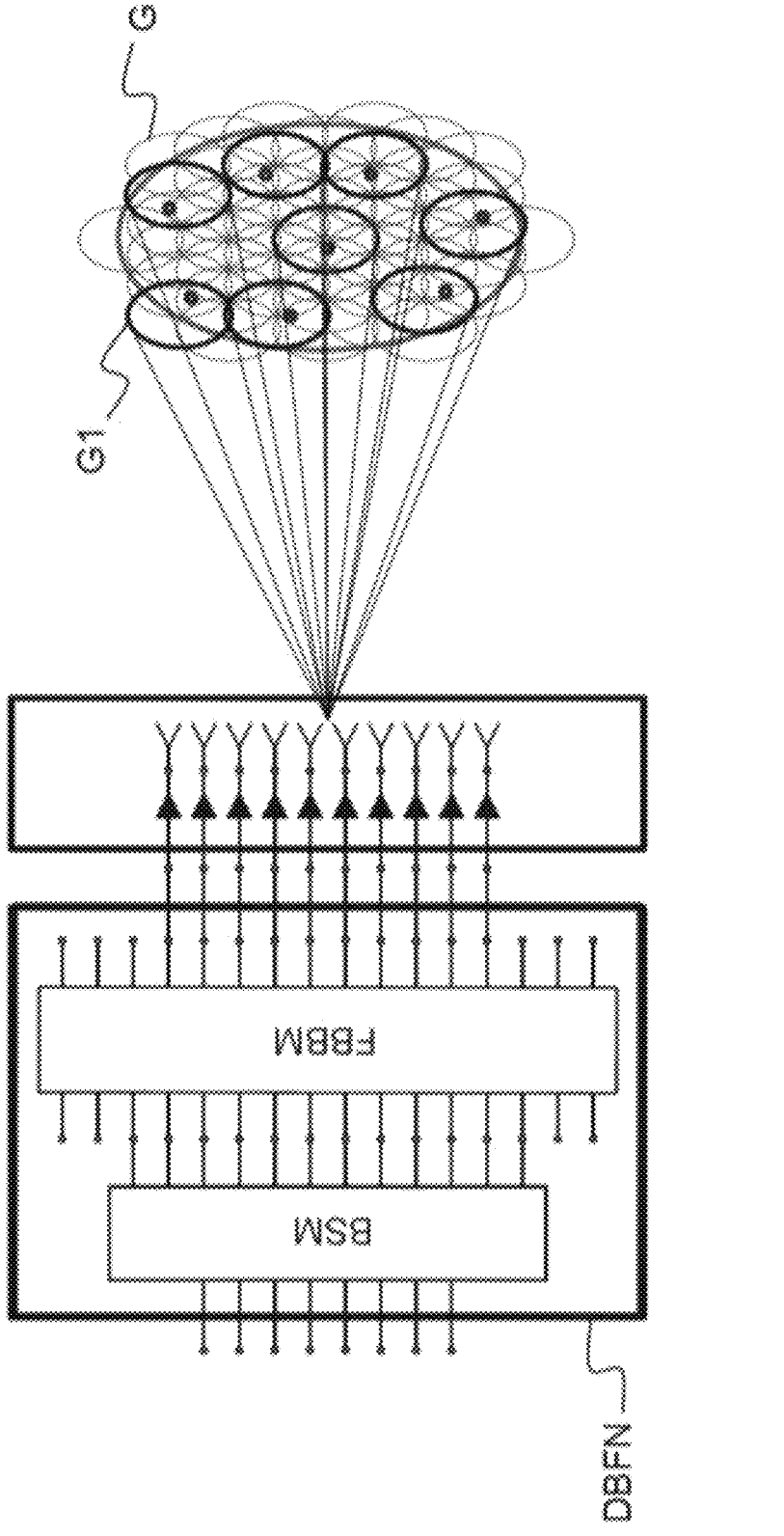
FIG. 9 shows a second embodiment of a beamformer configured to implement the invention.

FIG. 9 schematically depicts the operation of a digital beamformer DBFN for forming a grid of orthogonal beams according to a second embodiment of the invention.

FIG. 9 shows the processing required to form a single grid of beams, in the knowledge that, in an actual case, this processing is duplicated in order to form several grids of beams. Also, the processing is shown for an antenna operating in transmission mode.

In this second embodiment, the beamformer DBFN comprises a first stage composed of a beam selection matrix BSM and a second stage composed of a fixed beamforming matrix.

The second stage FBBM is configured to generate a fixed initial grid G of beams from which each grid of orthogonal beams is then generated. This step is performed by the first stage of selecting one grid of beams from among all of the beams in the fixed initial grid G.

FIG. 9 shows an example G1 of a grid of orthogonal beams which is selected by the beam selection matrix BSM.

REFERENCES

[1] B. Devilliers, A. Perez-Neira, and C. Mosquera, Joint Linear Precoding and Beamforming for the Forward Link of Multi-Beam Broadband Satellite Systems, IEEE Global Telecommunications Conference—GLOBECOM (2011).

[2] D. Christopoulos, S. Chatzinotas, G. Zheng, J. Grotz, and B. Ottersten, "Linear and nonlinear techniques for multibeam joint processing in satellite communications", EURASIP J. Wireless Commun. Netw., May 2012.

[3] P. Angeletti and R. de Gaudenzi, "A Pragmatic Approach to Massive MIMO for Broadband Telecommunication Satellites", IEEE Access, July 2020.

The invention claimed is:

1. A method for allocating resources in a system for telecommunications by a satellite with an active multi-beam antenna operating in a frequency band and for a coverage area wherein a plurality of user terminals is located, the method comprising the steps of:

dividing the frequency band into sub-bands such that, in each sub-band, beams formed by the active multi-beam antenna are stable for all frequencies in the sub-band, determining, for each of the sub-bands, a grid of orthogonal beams arranged to cover some of the coverage area, each grid of orthogonal beams having an angular depointing capacity which is configured to orient each grid of orthogonal beams to maximize a gain of each beam in the grid, selecting several subsets of user terminals, and allocating, to each of the selected subsets, one of the grids of orthogonal beams and a pointing direction of said one of the grids of orthogonal beams according to its angular depointing capacity, so that each beam in the grid points towards at least one of the user terminals in the selected subset.

2. The method for allocating resources according to claim 1, wherein a grid of orthogonal beams is determined so that a local maxima of the gain of a beam are positioned substantially at a local minima of the gain of the beams which are adjacent to said beam.

3. The method for allocating resources according to claim 1, wherein a grid of orthogonal beams and a pointing direction are allocated to each subset so that each user terminal is located at a distance from the centre of a beam which is less than a tenth of a width of the beam measured at 3 dB.

4. The method for allocating resources according to claim 1, wherein the step of allocating, to each of the selected subsets, one of the grids of orthogonal beams and a pointing direction, is performed via the following sub-steps, for each grid of orthogonal beams:

determining a subset of user terminals and a pointing direction of the grid such that all the user terminals in the subset are positioned at a distance from the centre of a beam which is less than a predetermined maximum distance, allocating, to the user terminals, frequency resources in the frequency sub-band which is associated with the grid.

5. The method for allocating resources according to claim 4, further comprising the step of, when user terminals in the coverage area are not selected at the end of the allocation step, reducing the size of the frequency sub-bands and carrying out the allocation step again.

6. The method for allocating resources according to claim 1, wherein a width of a frequency sub-band $\Delta f$ is, at the maximum, equal to $\Delta f < \alpha$. $f_0 * \lambda / (L. \sin \theta)$, with $f_0$ being the centre frequency of the sub-band, L the greatest length of the antenna, and $\theta$ the maximum angle of the multi-beam coverage, $\alpha$ being a positive number and $\lambda$ being a wavelength.

7. A satellite payload, comprising an antenna array (ANT1, ANT2), a device for allocating frequencies by sub-bands (COM) and a beamforming device (DBF TX, DBF RX which are configured to jointly implement steps of a method for allocating resources in a telecommunication system operating in a frequency band and for a coverage area wherein a plurality of user terminals is located, said steps comprising:

dividing the frequency band into sub-bands such that, in each sub-band, beams formed by the active multi-beam antenna are stable for all frequencies in the sub-band, determining, for each of the sub-bands, a grid of orthogonal beams arranged to cover some of the coverage area, each grid of orthogonal beams having an angular depointing capacity which is configured to orient each grid of orthogonal beams to maximize a gain of each beam in the grid, selecting several subsets of user terminals and allocating, to each of selected subsets, one of the grids of orthogonal beams and a pointing direction of said one of the grids of orthogonal beams according to its angular depointing capacity, so that each beam in the grid points towards at least one of the user terminals in the selected subset.

* * * * *